United States Patent
Andrews et al.

(10) Patent No.: US 7,125,935 B2
(45) Date of Patent: Oct. 24, 2006

(54) ION EXCHANGE MATERIALS

(75) Inventors: Mark Andrews, Preston (GB); Richard F. Bridges, Poulton le Fylde (GB); Peter Charnock, Poulton le Flyde (GB); John N Devine, Poulton le Fylde (GB); David J. Kemmish, Preston (GB); John E Lockley, Lancaster (GB); Brian Wilson, Garstang (GB)

(73) Assignee: Victrex Manufacturing Limited, Thornton Cleveleys (GB)

( * ) Notice: Subject to any disclaimer, the term of this patent is extended or adjusted under 35 U.S.C. 154(b) by 13 days.

(21) Appl. No.: 10/239,138

(22) PCT Filed: Mar. 21, 2001

(86) PCT No.: PCT/GB01/01253

§ 371 (c)(1),
(2), (4) Date: Dec. 19, 2002

(87) PCT Pub. No.: WO01/71839

PCT Pub. Date: Sep. 27, 2001

(65) Prior Publication Data

US 2004/0020764 A1    Feb. 5, 2004

(30) Foreign Application Priority Data

Mar. 22, 2000 (GB) .................................. 0006877.5
Dec. 21, 2000 (GB) .................................. 0031207.4

(51) Int. Cl.
*C08F 283/00* (2006.01)

(52) U.S. Cl. ...................... 525/461; 525/534; 264/234; 264/345; 264/462; 522/166

(58) Field of Classification Search ................ 264/432, 264/234, 345; 522/166; 525/471, 534
See application file for complete search history.

(56) References Cited

U.S. PATENT DOCUMENTS

| 4,657,990 A | 4/1987 | Daoust et al. |
| 4,808,352 A | 2/1989 | Bhateja |
| 5,700,880 A | 12/1997 | Sanchez et al. |

FOREIGN PATENT DOCUMENTS

| EP | 0 574 791 A2 | 12/1993 |
| EP | 0 932 213 A1 | 7/1999 |
| WO | WO 95/15991 | 6/1995 |
| WO | WP 00/15691 | 3/2000 |
| WO | WO 01/19896 A1 | 3/2001 |

OTHER PUBLICATIONS

Specification and Claims of co-pending U.S. Appl. No. 10/070,826, filed Jun. 3, 2002, Nat'l Phase of PCT/GB00/03449, filed Jun. 3, 2002, now Int'l Publication No. WO 01/19896 A1.

*Primary Examiner*—Bernard Lipman
(74) *Attorney, Agent, or Firm*—Nixon & Vanderhye

(57) ABSTRACT

A method of preparing an ion-conducting material, for example membrane, having reduced sensitivity to water includes a step of treating an ion-conducting polymeric material (especially a sulphonated polyaryletherketone and/or sulphone) which has at least some crystallinity or which is crystallizable with a means to increase its crystallinity. The ion-conducting material prepared may be used in a Membrane Electrode Assembly of a fuel cell.

17 Claims, 1 Drawing Sheet

ION EXCHANGE MATERIALS

This invention relates to an ion-exchange materials (e.g. polymer electrolyte membranes) and particularly, although not exclusively, relates to a method of preparing an ion-exchange membrane and such a membrane per se.

BACKGROUND OF THE INVENTION

One type of polymer electrolyte membrane fuel cell (PEMFC), shown schematically in FIG. 1 of the accompanying diagrammatic drawings, may comprise a thin sheet 2 of a hydrogen-ion conducting Polymer Electrolyte Membrane (PEM) sandwiched on both sides by a layer 4 of platinum catalyst and an electrode 6. The layers 2, 4, 6 make up a Membrane Electrode Assembly (MEA) of less than 1 mm thickness.

In a PEMFC, hydrogen is introduced at the anode (fuel electrode) which results in the following electrochemical reaction:

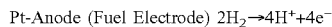

Pt-Anode (Fuel Electrode) $2H_2 \rightarrow 4H^+ + 4e^-$

The hydrogen ions migrate through the conducting PEM to the cathode. Simultaneously, an oxidant is introduced at the cathode (oxidant electrode) where the following electrochemical reaction takes place:

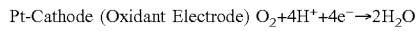

Pt-Cathode (Oxidant Electrode) $O_2 + 4H^+ + 4e^- \rightarrow 2H_2O$

Thus, electrons and protons are consumed to produce water and heat. Connecting the two electrodes through an external circuit causes an electrical current to flow in the circuit and withdraw electrical power from the cell.

Preferred ion-conducting polymeric materials for use as components of polymer electrolyte membranes in fuel cells have high conductivity (low EW, or high ion-exchange capacities), low water uptake, robustness and solubility in solvents which can be used to cast the membranes. However, some of the aforementioned requirements compete with one another. For example, steps taken to increase solubility of the materials in casting solvents may, disadvantageously, increase the water uptake of the materials; and steps taken to increase the conductivity of the materials will tend also to increase water absorption leading to premature failure of the materials when used in fuel cells.

SUMMARY OF THE INVENTION

It is an object of the present invention to address problems associated with the provision of polymer electrolyte membranes.

According to a first aspect of the invention, there is provided a method of preparing an ion-conducting membrane suitably having reduced sensitivity to water, the method including the step of treating a first ion-conducting polymeric material which has at least some crystallinity or which is crystallisable with a means to increase its crystallinity (hereinafter "crystallinity increasing means"), wherein said first ion-conducting polymeric material so treated (hereinafter "said treated ion-conducting material") is a component of said ion-conducting membrane.

Unless otherwise stated in this specification, a phenyl moiety may have 1,4- or 1,3-, especially 1,4-, linkages to moieties to which it is bonded.

The existence and/or extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, Differential Scanning Calorimetry (DSC) could be used to assess crystallinity. The level of crystallinity in said first ion-conducting polymeric material may be 0% (e.g. where the material is crystallisable); or the level of crystallinity may be at least 1%, suitably at least 5%, is preferably at least 10%, more preferably at least 15% and, especially, at least 20% weight fraction, suitably when measured as described by Blundell and Osborn. The level of crystallinity in said first polymeric material may be less than 20%, preferably less than 15%, more preferably less than 10%, especially less than 5%.

The level of crystallinity in said treated ion-conducting material, suitably measured as described above, may be at least 1% greater than the level of crystallinity in said first polymeric material. The level of crystallinity may be 5% or greater. Suitably, the level of crystallinity is at least 10% greater, preferably at least 15% greater, more preferably at least 20% greater, especially at least 25% greater.

Said crystallinity increasing means may comprise heating said first ion-conducting polymeric material, suitably when in a substantially dry state. Preferably, said first polymeric material is heated at a temperature greater than its Tg, suitably under an inert, e.g. a nitrogen, atmosphere, for at least 0.5 minutes and less than 30 minutes. Alternatively and/or additionally, said crystallinity increasing means may comprise treatment of said first ion-conducting polymeric material with a crystallinity increasing solvent. Preferred such solvents are polar aprotic solvents and may include acetone, dimethyacetamide (DMA), dimethylformamide (DMF), tetrahydrofuran (THF) and dichloromethane. After use of a crystallinity increasing solvent, especially acetone, dichloromethane or tetrahydrofuran, there is preferably a further step which involves removal of the solvent, for example by evaporation.

The sensitivity (or water uptake) of the first ion-conducting polymeric material may be assessed as described in the examples hereinafter. The difference between the sensitivity of the material to water before and after treatment may be at least 5%, suitably at least 10%, preferably at least 20%, more preferably at least 40%, especially at least 60%. In some cases, it may be at least 80%

As described above, it is a requirement of said first ion-conducting polymeric material that it has at least some crystallinity or is crystallisable. The material may be made up of a number of repeat units, some of which may be crystallisable or have some crystallinity and some of which will be amorphous. For example, repeat units provided with ion-exchange sites, for example sulphonate groups, will tend to be amorphous, as will repeat units which include bulky groups or —$SO_2$—. Repeat units which are crystalline or crystallisable suitably include moieties which can be exchanged with ether units in a polyetherketone crystal lattice. Ketone units and/or —S— units may be exchanged and may, therefore, be components of crystalline or crystallisable units.

Thus, said first ion-conducting polymer preferably includes a repeat unit which suitably includes aromatic group containing moieties linked by —CO— and/or —Q— groups, where Q represents —O— or —S—, but does not include —$SO_2$— and/or any groups whose shape and/or conformation is/are incompatible with the crystalline conformation adopted by polyetherketone units.

A preferred first ion-conducting polymeric material (also referred to herein as "first material") is one having a moiety of formula

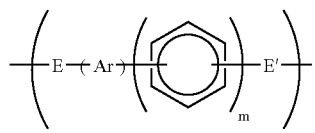
(I)

and/or a moiety of formula

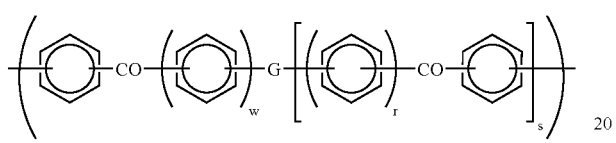
(II)

and/or a moiety of formula

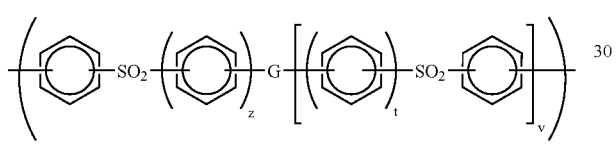
(III)

wherein at least some of the units I, II and/or III are funtionalized to provide ion-exchange sites; wherein the phenyl moieties in units I, II, and III are independently optionally substituted and optionally cross-linked; wherein said material is crystallisable or crystalline; and wherein m, r, s, t, v, w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i)* or (i) to (x) which is bonded via one or more of its phenyl moieties to adjacent moieties

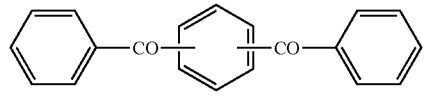
(i)*

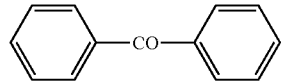
(i)

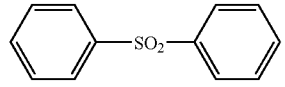
(ii)

(iii)

-continued

(iv)

(v)

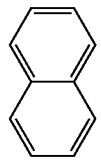
(vi)

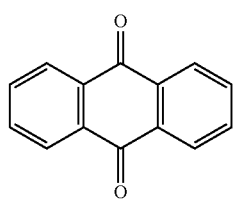
(vii)

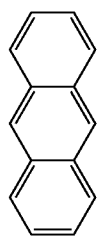
(viii)

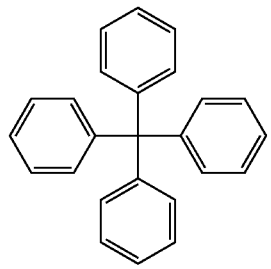
(ix)

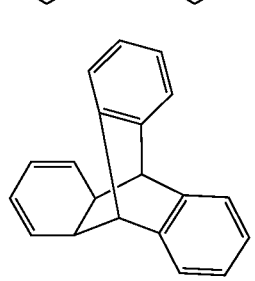
(x)

In (i)*, the middle phenyl may be 1,4- or 1,3-substituted.

Suitably, to provide said ion exchange sites, said polymeric material is sulphonated, phosphorylated, carboxylated, quaternary-aminoalkylated or chloromethylated, and optionally further modified to yield —$CH_2PO_3H_2$, —$CH_2NR_3^{20+}$ where $R^{20}$ is an alkyl, or —$CH_2NAr_3^{x+}$ where $Ar^x$ is an aromatic (arene), to provide a cation or anion exchange membrane. Further still, the aromatic moiety may contain a hydroxyl group which can be readily elaborated by existing methods to generate —$OSO_3H$ and —$OPO_3H_2$ cationic exchange sites on the polymer. Ion exchange sites of the type stated may be provided as described in WO95/08581.

Preferably, said first material is sulphonated. Preferably, the only ion-exchange sites of said first material are sites which are sulphonated.

References to sulphonation include a reference to substitution with a group —$SO_3M$ wherein M stands for one or more elements selected with due consideration to ionic valencies from the following group: H, $NR_4^{y+}$, in which $R^y$ stands for H, $C_1$–$C_4$ alkyl, or an alkali or alkaline earth metal or a metal of sub-group 8, preferably H, $NR_4^+$, Na, K, Ca, Mg, Fe, and Pt. Preferably M represents H. Sulphonation of the type stated may be provided as described in WO96/29360.

Unless otherwise stated in this specification, a phenyl moiety may have 1,4- or 1,3-, especially 1,4-, linkages to moieties to which it is bonded.

Said first material may include more than one different type of repeat unit of formula I; more than one different type of repeat unit of formula II; and more than one different type of repeat unit of formula III.

Said moieties I, II and III are suitably repeat units. In the polymer, units I, II and/or III are suitably bonded to one another—that is, with no other atoms or groups being bonded between units I, II, and III.

Where the phenyl moieties in units I, II or III are optionally substituted, they may be optionally substituted by one or more halogen, especially fluorine and chlorine, atoms or alkyl, cycloalkyl or phenyl groups. Preferred alkyl groups are $C_{1-10}$, especially $C_{1-4}$, alkyl groups. Preferred cycloalkyl groups include cyclohexyl and multicyclic groups, for example adamantyl. In some cases, the optional substituents may be used in the cross-linking of the polymer. For example, hydrocarbon optional substituents may be functionalised, for example sulphonated, to allow a cross-linking reaction to take place. Preferably, said phenyl moieties are unsubstituted.

Another group of optional substituents of the phenyl moieties in units I, II or III include alkyls, halogens, $C_yF_{2y+1}$ where y is an integer greater than zero, O—$R^q$ (where $R^q$ is selected from the group consisting of alkyls, perfluoralkyls and aryls), CF=$CF_2$, CN, $NO_2$ and OH. Trifluormethylated phenyl moieties may be preferred in some circumstances.

Where said first material is cross-linked, it is suitably cross-linked so as to improve its properties as a polymer electrolyte membrane, for example to reduce its swellability in water. Any suitable means may be used to effect cross-linking. For example, where E represents a sulphur atom, cross-linking between polymer chains may be effected via sulphur atoms on respective chains. Alternatively, said polymer may be cross-linked via sulphonamide bridges as described in U.S. Pat. No. 5,561,202. A further alternative is to effect cross-linking as described in EP-A-0008895.

However, for first materials according to the inventions described herein which are crystalline there may be no need to effect cross-linking to produce a material which can be used as a polymer electrolyte membrane. Such polymers may be easier to prepare than cross-linked polymers. Preferably, said first material is not optionally cross-linked as described.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the first material does not include a —S— moiety. Preferably, G represents a direct link.

Suitably, "a" represents the mole % of units of formula I in said first material, suitably wherein each unit I is the same; "b" represents the mole % of units of formula II in said material, suitably wherein each unit II is the same; and "c" represents the mole % of units of formula III in said material, suitably wherein each unit III is the same. Preferably, is in the range 45–100, more preferably in the range 45–55, especially in the range 48–52. Preferably, the sum of b and c is in the range 0–55, more preferably in the range 45–55, especially in the range 48–52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Preferably, said first material consists essentially of moieties I, II and/or III.

Said first material may be a homopolymer having a repeat unit of general formula

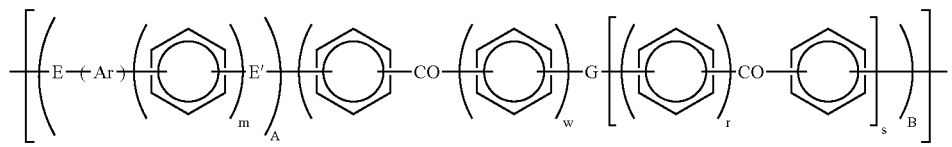

IV or a homopolymer having a repeat unit of general formula

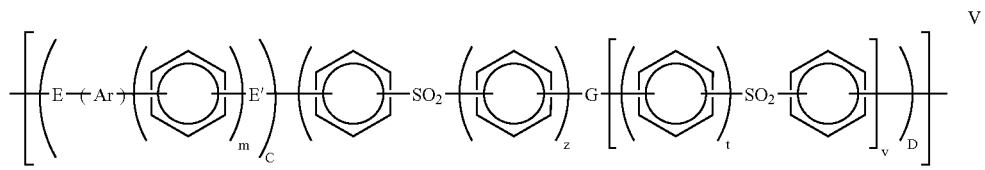

or a random or block copolymer of at least two different units of IV and/or V
wherein A, B, C and D independently represent 0 or 1 and E, E', G, Ar, m, r, s, t, v, w and z are as described in any statement herein.

As an alternative to a polymer comprising units IV and/or V discussed above, said first material may, be a homopolymer having a repeat unit of general formula

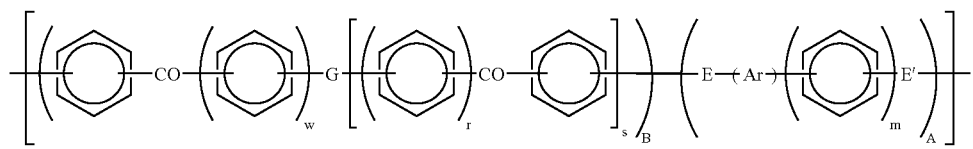

or a homopolymer having a repeat unit of general formula

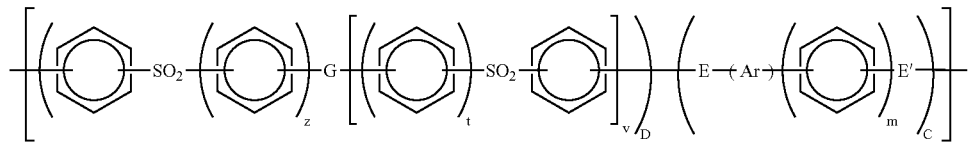

or a random or block copolymer of at least two different units of IV* and/or V*, wherein A, B, C, and D independently represent 0 or 1 and E, E', G, Ar, m, r, s, t, v, w and z are as described in any statement herein.

Preferably, m is in the range 0–3, more preferably 0–2, especially 0–1. Preferably, r is in the range 0–3, more preferably 0–2, especially 0–1. Preferably t is in the range 0–3, more preferably 0–2, especially 0–1. Preferably, s is 0 or 1. Preferably v is 0 or 1. Preferably, w is 0 or 1. Preferably z is 0 or 1.

Preferably Ar is selected from the following moieties (xi)* and xi) to (xxi):

(xi)*
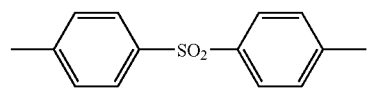

(xi)
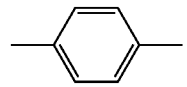

-continued (xii)

(xiii)
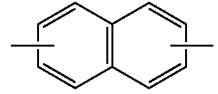

(xiv)

(xv)

(xvi)
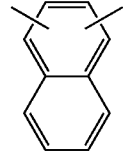

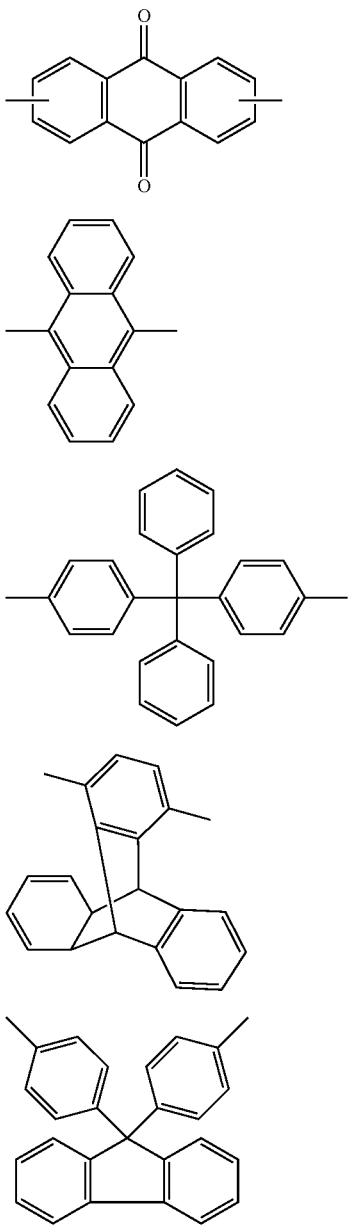

(xvii)

(xviii)

(xix)

(xxi)

(xx)

In (xi)*, the middle phenyl may be 1,4- or 1,3-substituted.

Preferably, (xv) is selected from a 1,2-, 1,3-, or a 1,5-moiety; (xvi) is selected from a 1,6-, 2,3-, 2,6- or a 2,7-moiety; and (xvii) is selected from a 1,2-, 1,4-, 1,5-, 1,8- or a 2,6-moiety.

One preferred class of first materials may include at least some ketone moieties in the polymeric chain. In such a preferred class, the polymer preferably does not only include —O— and —$SO_2$— moieties between aryl (or other unsaturated) moieties in the polymeric chain. Thus, in this case, suitably, a polymer of the first aspect does not consist only of moieties of formula III, but also includes moieties of formula I and/or II.

One preferred class of first materials does not include any moieties of formula III, but suitably only includes moieties of formulae I and/or II. Where said polymer is a homopolymer or random or block copolymer as described, said homopolymer or copolymer suitably includes a repeat unit of general formula IV. Such a polymer may, in some embodiments, not include any repeat unit of general formula V.

Suitable moieties Ar are moieties (i)*, (i), (ii), (iv) and (v) and, of these, moieties (i)*, (i), (ii) and (iv) are preferred. Preferred moieties Ar are moieties (xi)*, (xi), (xii), (xiv), (xv) and (xvi) and, of these, moieties (xi)*, (xi), (xii) and (xiv) are especially preferred. Another preferred moiety is moiety (v), especially, moiety (xvi). In relation, in particular to the alternative first materials comprising units IV* and/or V*, preferred Ar moieties are (v) and, especially, (xvi).

Preferred first materials include an electron-rich, relatively non-deactivated, easily sulphonatable unit, for example a multi-phenylene moiety or a fused-rings aromatic moiety, such as naphthalene. Such an easy to sulphonate unit may be sulphonated under relatively mild conditions to introduce two sulphonate groups per unit. Thus, preferred polymers may have at least $10\pi$ electrons in a delocalized aromatic moiety. The number of $\pi$ electrons may be 12 or less. Preferred polymers include a biphenylene moiety. Other preferred polymers include a naphthalene moiety.

Preferred polymers include said electron rich, non-deactivated, easily sulphonatable unit bonded to two oxygen atoms. Especially preferred polymers include a —O-biphenylene-O— moiety. Other especially preferred polymers is include a —O-naphthalene-O— moiety.

Preferred first materials include a first type of moiety which is relatively difficult to sulphonate and a second type of moiety which is relatively easy to sulphonate. For example, said second moiety may be sulphonatable using the relatively mild method described in Example 2 hereinafter, whereas the first moiety may be substantially non-sulphonatable in such a method. The use of the method of Example 2 may be advantageous over currently used methods which use oleum. A preferred second said moiety includes a moiety —$Ph_n$— wherein n is an integer of at least 2. Said moiety is preferably bound to at least one ether oxygen. Especially preferred is the case wherein said moiety is —O—$Ph_n$—O— where said ether groups are para to the Ph—Ph bond.

Preferred first materials are copolymers comprising, preferably consisting essentially of, a first repeat unit which is selected from the following:

(a) a unit of formula IV wherein E and E' represent oxygen atoms, G represents a direct link, Ar represents a moiety of structure (iv), m and s represent zero, w represents 1 and A and B represent 1;

(b) a unit of formula IV wherein E represents an oxygen atom, E' represents a direct link, Ar represents a moiety of structure (i), m represents zero, A represents 1, B represents zero;

(c) a unit of formula V wherein E and E' represent oxygen atoms, G represents a direct link, Ar represents a moiety of structure (iv), m and v represent zero, z represents 1 and C and D represent 1;

(d) a unit of formula V wherein E represents an oxygen atom, E' represents a direct link, Ar represents a moiety of structure (ii), m represents 0, C represents 1, D represents 0; or (e) a unit of formula V wherein E and E' represents an oxygen atom, Ar represents a structure (i), m represents 0, C represents 1, Z represents 1, G represents a direct link, v represents 0 and D represents 1;

Other preferred first repeat units include:

(aa) a unit of formula IV wherein E represents an oxygen atom E' represents a direct link, Ar represents a structure (i)*, m represents 0, A represents 1, B represents 0;

(bb) a unit of formula IV wherein E and E' represent oxygen atoms, Ar represents a structure (iv), m and w represent 0, G represents a direct link, s and r represent 1, A and B represent 1;

(cc) a unit of formula IV wherein E and E' represent oxygen atoms, Ar represents a structure (i), m and w represent 0, G represents a direct link, s and r represent 1, A and B represent 1;

and a second repeat unit which is selected from the following:

(f) a unit of formula IV wherein E and E' represent oxygen atoms, G represents a direct link, Ar represents a moiety of structure (iv), m represents 1, w represents 1, s represents zero, A and B represent 1;

(g) a unit of formula IV wherein B represents an oxygen atom, E' is a direct link, G represents a direct link, Ar represents a moiety of structure (iv), m and s represent zero, w represent 1, A and B represent 1;

(h) a unit of formula V wherein E and E' represent oxygen atoms, G represents a direct link, Ar represents a moiety of structure (iv), m represents 1, z represents 1, v represents 0, C and D represent 1; and (i) a unit of formula V wherein E represents an oxygen atom, E' represents a direct link, G represents a direct link, Ar represents a moiety of structure (iv), m and v represent zero, z represents 1, C and D represent 1;

Other second units which may form copolymers with any of said first repeat units (a) to (e) (and/or with units (aa), (bb) and (cc)) above include: a unit of formula IV wherein E and E' represent oxygen atoms, G represents a direct link, Ar represents a moiety of structure (v), m represents 0, w represents 1, s represents 0, A and B represent 1; or a unit of formula V wherein E and E' represent oxygen atoms, G represents a direct link, Ar represents a moiety of structure (v), m represents 0, z represents 1, v represents 0, C and D represent 1.

Preferred first materials for some situations may comprise first units selected from (a), (b), (c) and (e) and second units selected from (f), (g), (h) or (i). A polymer comprising units (d) and (h) may also be preferred. In some situations, first units may be selected from (aa), (bb) and (cc) and second units may be selected from (f), (g), (h) or (i).

More preferred first materials are copolymers having a first repeat unit selected from those described above, especially repeat units (b), (d) or (e) in combination with a second repeat unit selected from units (f) or (h). Other particularly preferred polymers are copolymers having a first repeat unit selected from (aa) and (bb) in combination with a second repeat unit selected from (f) or (h).

Preferred first materials having repeat unit(s) of formulae IV* and V* may include: a unit of formula IV* wherein Ar represents a moiety of structure (v), E represents a direct link, E' represents an oxygen atom, G represents a direct link, w, s and m represent 0, A and B represent 1; and/or a repeat unit of formula V* wherein Ar represents a moiety of structure (v), E represents a direct link, E' represents an oxygen atom, G represents a direct link, z, v and m represent 0, C and D represent 1.

Said first materials having repeat units IV* and V* may include any of repeat units (a) to (i) (and/or units (aa), (bb) and (cc)) described above.

In some situations, first materials which include at least one repeat unit of formula IV or formula IV* may be preferred.

Copolymers may be prepared having one or more first repeat units and one or more of said second repeat units.

Where said first material is a copolymer as described, the mole % of co-monomer units, for example said first and second repeat units described above, may be varied to vary the solubility of the polymer in solvents, for example in organic solvents which may be used in the preparation of films and/or membranes from the polymers and/or in other solvents, especially water. Also, the mole % of co-monomer units may be varied to vary the level of crystallinity and/or crystallisability. For homopolymers, the level of crystallinity and/or crystallisability may be determined by the level of functionalisation with ion-exchange sites.

Preferred first ion-conducting polymeric materials suitably have a solubility of at least 10% w/w, preferably a solubility in the range 10 to 30% w/w in a polar aprotic solvent, for example NMP, DMSO or DMF. Preferred materials are substantially insoluble in boiling water after treatment with said crystallinity increasing means.

First units of the type described above (with the exception of units (a) and (c)) may be relatively difficult to sulphonate, whereas second units of the type described may be easier to sulphonate.

Where a phenyl moiety is sulphonated, it may only be mono-sulphonated. However, in some situations it may be possible to effect bi- or multi-sulphonation.

In general terms, where a said first material includes a —O-phenyl-O— moiety, up to 100 mole % of the phenyl moieties may be sulphonated. Where a said first material includes a —O-biphenylene-O— moiety, up to 100 mole % of the phenyl moieties may be sulphonated. It is believed to be possible to sulphonate relatively easily —O-(phenyl)$_n$-O— moieties wherein n is an integer, suitably 1–3, at up to 100 mole %. Moieties of formula —O-(phenyl)$_n$-CO— or —O-(phenyl)$_n$-SO$_2$— may also be sulphonated at up to 100 mole % but more vigorous conditions may be required. Moieties of formulae —CO-(phenyl)$_n$-CO— and —SO$_2$-(phenyl)$_n$—SO$_2$— are more difficult to sulphonate and may be sulphonated to a level less than 100 mole % or not at all under some sulphonation conditions.

The glass transition temperature ($T_g$) of said first material may be at least 144° C., suitably at least 150° C., preferably at least 154° C., more preferably at least 160° C., especially at least 164° C. In some cases, the Tg may be at least 170° C., or at least 190° C. or greater than 250° C. or even 300° C.

Said first material may have an inherent viscosity (IV) of at least 0.1, suitably at least 0.3, preferably at least 0.4, more preferably at least 0.6, especially at least 0.7 (which corresponds to a reduced viscosity (RV) of least 0.8) wherein RV is measured at 25° C. on a solution of the polymer in concentrated sulphuric acid of density 1.84 gcm$^{-3}$, said solution containing 1 g of polymer per 100 cm$^{-3}$ of solution. IV is measured at 25° C. on a solution of polymer in concentrated sulphuric acid of density 1.84 gcm$^3$, said solution containing 0.1 g of polymer per 100 cm$^3$ of solution.

The measurements of both RV and IV both suitably employ a viscometer having a solvent flow time of approximately 2 minutes.

The main peak of the melting endotherm (Tm) for said first material may be at least 300° C.

Said first ion-conducting polymeric material may include a crystalline or crystallisable unit which is of general formula IV or IV* as described above, provided said unit is crystallisable. Suitably, to be crystallisable, said second unit does not include any Ar group of formula (ii), (viii), (ix) or (x). More preferably, it may also not include an AR group of formula (v), (vi) or (vii). Preferred Ar groups consist of one or more phenyl groups in combination with one or more carbonyl and/or ether groups.

Said ion-conducting material, for example membrane of said first aspect may comprise a single material which may define a PEM of, for example, a fuel cell. In this event, therefore, a catalyst material may contact said single material on opposite sides thereof. Preferably, however, said ion-conducting membrane is a composite membrane which includes said first ion-conducting polymeric material together with another material (hereinafter "said composite membrane material").

The first ion-conducting material may be associated with said composite membrane material to form a composite membrane in a variety of ways. For example, said first ion-conducting material in the form of an unsupported conductive polymer film can be contacted with, for example laminated to, said composite membrane material. Alternatively (and preferably), one of either said composite membrane material or said first ion-conducting material may be porous and the other one of either said composite membrane material or said first ion-conducting material may be impregnated in the porous material.

Said composite membrane material may be a support material for supporting said first ion-conducting polymeric material. In this case, said composite membrane material preferably is stronger and/or has a lower water absorbance compared to said first ion-conducting material.

Alternatively, said first ion-conducting polymeric material may be a support for the composite membrane material. In a further alternative, said first ion-conducting polymeric material and said composite membrane material may define a homogenous mixture.

Examples of composite membrane materials include:
(A) materials comprising or, preferably consisting essentially of, polytetrafluoroethylene, suitably provided as a porous film. Such a support material may be as described in accordance with WO97/25369 and WO96/28242 and the contents of the aforementioned documents as regards the polytetrafluoroethylene are incorporated herein by reference; and surface modified polytetrafluoro-ethylene.
(B) optionally-substituted polyolefins, especially optionally-substituted polypropylene or polyethylene and copolymers of any of the aforesaid.
(C) Lyotropic liquid crystalline polymers, such as a polybenzazole (PBZ) or polyaramid (PAR or Kevlar®) polymer. Preferred polybenzazole polymers include polybenzoxazole (PBO), polybenzothiazole (PBT) and polybenzimidazole (PBI) polymers. Preferred polyaramid polymers include polypara-phenylene terephthalamide (PPTA) polymers. Structures of the above-mentioned polymers are listed in Table 4 of WO99/10165, the contents of which are incorporated herein by reference.
(D) Polysulfone (PSU), polyimide (PI), polyphenylene oxide (PPO), polyphenylene sulphoxide (PPSO), polyphenylene sulphide (PPS), polyphenylene sulphide sulphone (PPS/SO$_2$), polyparaphenylene (PPP), polyphenylquinoxaline (PPQ), polyarylketone, polyethersulphone (PES) and polyetherketone and polyetheretherketone polymers, for example PEK™ polymers and PEEK™ polymers respectively from Victrex Plc.
(E) Polymers have moieties I, II and/or III as described above for said first ion-conducting polymeric material, except that such polymers may be crystallisable, crystalline or amorphous and are not functionalised to provide ion-exchange sites.
(F) polymers described in (E), wherein at least some units I, II and/or III are functionalized to provide ion-exchange sites suitably of a type described herein with reference to said first ion-conducting polymeric material.
(G) Polymers described in (D) which are functionalized, especially sulphonated, to provide ion-exchange sites, as described in WO99/10165.
(H) Perfluorinated ionomers, for example carboxyl-, phosphonyl- or sulphonyl-substituted perfluorinated vinyl ethers as described in WO99/10165. An especially preferred example is NAFION (Trade Mark)—a perfluorosulphonate ionomer described in Journal of Electrochemical Society, Vol 132, pp 514–515 (1985).
(I) Ion-conductive polymers comprising $\alpha,\beta,\beta$-trifluorostyrene monomeric units as described in WO97/25369, the content of which is incorporated herein by reference.
(J) Ion-conducting polymers comprising polystyrene sulphonic acid (PSSA), polytrifluorostyrene sulphonic acid, polyvinyl phosphonic acid (PVPA), polyvinyl carboxylic (PVCA) acid and polyvinyl sulphonic acid (PVSA) polymers, and metals salts thereof.

Where said composite membrane material is as described in (E) or (F)) above, in some embodiments it may have at least some crystallinity or may be crystallisable. In this event, the method of said first aspect may include the step of treating said composite membrane material with a said crystallinity increasing means as described above with reference to said first ion-conducting polymeric material.

When the composite membrane material is not an ion-conducting material it preferably acts as a support for said first ion-conducting polymeric material. The ion-conducting material may be associated with the composite membrane material in a variety of ways. The method may involve laminating said first ion-conducting material and said composite membrane material together. Preferably, however, the method includes impregnating porous composite membrane material with said first ion-conducting material.

Said porous composite membrane material may be a fabric or a microporous membrane.

Where said composite membrane material is a fabric, the method may include a step of contacting the fabric with a first solvent formulation comprising a first solvent and said first ion-conducting material, wherein the first ion-conducting material is preferably dissolved in a first solvent. Said fabric may, therefore, be impregnated with said formulation. Thereafter, said first solvent may be removed, leaving said conductive polymer in pores of said fabric.

Said first solvent and said porous composite membrane material may be selected so that said first solvent solubilises, to some degree, a surface of the material. Said first solvent may be capable of dissolving the material to a level of at least 5 wt %. This may improve contact between the first ion-conducting material and said composite membrane material. Optionally, said first solvent may be capable of functionalizing (e.g. sulphonating) said composite membrane material to provide ion-exchange site on a surface thereof as hereinbefore described.

Said first solvent may be a polar aprotic solvent, for example NMP, or may be a protic solvent. A polar aprotic solvent may not be capable of solubilising said composite membrane support material whereas a protic solvent may be able to solubilize and, in some cases, functionalise (e.g. sulphonate) said material.

Where said first solvent is a protic solvent, said solvent preferably comprises or consists essentially of a strong acid solvent. Said solvent may comprise at least 90%, preferably at least 95%, more preferably at least 97%, especially at least 98% acid. Said strong acid solvent may be one or more of sulphuric acid, a sulphonic acid (e.g. methane sulphonic acid, trichloromethane sulphonic acid, trifluoromethane sulphonic acid), hydrofluoric acid and phosphoric acid.

Preferably, a said protic first solvent comprises or consists essentially of sulphuric acid. Said solvent may include at least 96%, preferably at least 98% acid. Said solvent may include less than 99% acid. A said protic first solvent is preferably arranged to sulphonate easy to sulphonate units described herein, but not difficult to sulphonate units Where said composite membrane material is a microporous membrane, the method may include the step of contacting the microporous membrane with a first solvent formulation comprising a first solvent and said first ion-conducting material, wherein the first material is preferably dissolved in said first solvent. Said microporous membrane may, therefore, be impregnated with said formulation. Thereafter, said first solvent may be removed, leaving said conductive polymer in pores in said microporous membrane.

Where said composite membrane material is a microporous membrane, preparation of the membrane may include a step of contacting a composite membrane material with a solvent formulation comprising said first solvent. Said first solvent preferably solubilizes, to some degree, the composite membrane material. Said first solvent may be as described above with reference to the treatment of said fabric. Subsequently, the method preferably includes the step of contacting the composite membrane material with a second solvent. Said second solvent is preferably arranged to cause phase inversion. Phase inversion suitably results in said composite membrane material being rendered porous. Said second solvent is preferably a non-solvent for said material. Preferred second solvents are aqueous; especially preferred is water.

Said microporous composite membrane material is preferably contacted with said first ion-conducting material so that said polymer penetrates into pores formed in said composite membrane material. Said first ion-conducting polymer may be contacted with said composite membrane material after pores have been formed therein, suitably by phase inversion as described. In this regard, said first ion-conducting polymer may be provided in a solvent, which may have the same identity as said first solvent described above. Such a combination may be contacted with a microporous membrane prepared as described to impregnate pores of the membrane with said first ion-conducting polymer.

After deposition of said first ion-conducting polymer in pores, as described above, the arrangement may be post-treated, suitably so as to produce a substantially continuous film of said ion-conducting polymer on the composite membrane material. Post-treatment may include the step of contacting the arrangement comprising first ion-conducting polymer in pores of said composite membrane material with a third solvent in which said first ion-conducting polymer is relatively soluble and said composite membrane material is substantially insoluble. This may cause some dissolution of the first ion-conducting polymer in the pores resulting in Film formation by coalescence of material between pores. Optionally, a said ion-conducting polymer may be provided in said third solvent, thereby to deposit a layer of said ion-conducting polymer on the surface of said composite membrane material. Said third solvent may have the same identity as said first solvent described above. Said third solvent is preferably a polar aprotic solvent. NMP is a suitable solvent.

When the composite membrane material is an ion-conducting material either said composite membrane material or said first ion-conducting material may act as a support for the other one of either the ion-conducting material or membrane material; or, alternatively, said composite membrane material and said first ion-conducting material may be mixed together, for example to define a substantially homogenous alloy as described in U.S. Pat. No. 5,834,566.

Where the composite membrane material provides a support for the first ion-conducting material, an ion-conducting membrane may be prepared as described above with reference to the preparation of an ion-conducting membrane comprising a composite membrane material which is not an ion-conducting material and said first ion-conducting polymeric material. Where, however, the first ion-conducting polymeric material provides a support for composite membrane material which is ion-conducting, an ion-conducting membrane may be prepared as described above (with reference to the preparation of the ion-conducting membrane of composite membrane material which comprises non-ion conducting material together with said first ion-conducting polymeric material) except that the reference to composite membrane material in said description should be replaced with a reference to said first ion-conducting material and said reference to said first ion-conducting polymeric material should be replaced with a reference to said composite membrane material which is ion-conducting.

The method preferably includes the step of preparing a precursor material, for example membrane which includes said first ion-conducting polymeric material and, subsequently, treating said precursor material, for example membrane with said crystallinity increasing means thereby to prepare said ion-conducting material, for example membrane of reduced sensitivity to water. Treatment with said means may be carried out at any time after preparation of said precursor material, for example membrane.

Preferably, after treatment with said crystallinity increasing means, the solubility of said first ion-conducting polymeric material in a solvent in which said first ion-conducting material may have been dissolved in order to prepare said precursor material, for example membrane is reduced. It may be reduced to a level such that it would be substantially impossible to cast a satisfactory material, for example membrane from the first ion-conducting material using said first solvent after treatment with said crystallinity increasing means.

Where the ion-conducting membrane includes a composite membrane material which has at least some crystallinity or which is crystallisable, said composite membrane material and said first ion-conducting polymeric material may be treated together with said crystallinity increasing means. Alternatively, after the composite membrane material has been associated with said first ion-conducting material to prepare a precursor membrane, the combination may be treated independently with a said crystallinity increasing means and said means may be the same or different for the respective treatments. For example, in one embodiment, after the first ion-conducting material or said composite membrane material has been formed into a film, it may be treated with said crystallinity increasing means. Then, the other one of said first ion-conducting material or said composite membrane material is contacted with said treated material. In this respect, the treated material may suitably be rendered porous as described herein and contacted. Thereafter, the as yet untreated first ion-conducting material or composite membrane material may be treated with a said crystallinity increasing means.

In general terms, said first ion-conducting material may be arranged as follows when associated with said composite membrane material to form a composite membrane:
FC1—penetrating pores of the composite membrane material
FC2—acting as a support material which is penetrated by said composite membrane material.
FC3—acting as a support material wherein it is surface functionalised to provide ion-exchange sites (but the bulk of the polymer is not functionalised).

Said composite membrane material may be arranged as follows when associated with said first ion-conducting polymer:
CM1—as a non-crystallisable and non-crystalline material which penetrates pores of the composite membrane material.
CM2—as a fabric (e.g. polyetheretherketone, polyetherketone, polyetherdiphenyletherketone/polyetherketone.)
CM3—as a non-sulphonated amorphous microporous membrane
CM4—as a non-sulphonated semi-crystalline microporous membrane.

The combinations of first ion-conducting materials and composite membrane material may be as follows:
1. FC1 only. Post treated to increase crystallinity
2. FC1+CM2. Post treated to increase crystallinity (only FC1 will be affected).
3. FC1+CM3. Post treated to increase crystallinity (only FC1 will be affected.
4. FC1+CM4. Post treated to increase crystallinity (FC1 and CM4 will be affected).
5. FC1+CM4. CM4 is pre-treated to increase crystallinity. FC1 is post treated.
6. FC1+FC3. Post treated to increase crystallinity (FC1 and FC3 will be affected).
7. FC1+FC3. Surface functionalised FC3 pre-treated to increase crystallinity. FC1 post treated to increase crystallinity.
8. FC1+FC2. Post treated to increase crystallinity. (FC1 and FC1 will be affected).
9. FC1+FC2. FC2 is pre-treated to increase crystallinity. FC1 is post treated to increase crystallinity.
10. CM1+CM4. Post treated to increase crystallinity (CM4 only will be affected).
11. CM1+CM4. CM4 is pre-treated to increase crystallinity.
12. CM1+FC3. Post treated to increase crystallinity (surface functionalised FC3 will be affected).
13. CM1+FC3. Surface functionalised FC3 pre-treated to increase crystallinity.
14. CM1+FC2. Post treated to increase crystalllinity (FC2 will be affected).
15. CM1+FC2. FC2 is pre-treated to increase crystallinity.

The method may include a subsequent step of associating a catalyst material with said ion-conducting membrane prepared and suitably preparing a MEA. The MEA may be for a hydrogen or Direct Methanol Fuel Cell.

The invention extends to any novel ion-conducting material, for example membrane described herein.

The invention extends to an ion-conducting material, for example membrane prepared in a method according to said first aspect.

The invention extends to a method of preparing a Membrane Electrode Assembly (MEA) which includes associating a catalyst material and/or electrode with an ion-conducting membrane prepared according to said first aspect.

The invention extends to any novel MEA described herein per se.

The invention extends to a MEA prepared in a method according to said first aspect and/or described herein.

An ion-conducting material, for example membrane as described herein may be used in fuel cells or electrolysers and, accordingly, the invention extends to a fuel cell or electrolyser incorporating an ion-conducting material, for example membrane prepared in a method according to said first aspect and/or as described herein. The material, for example membrane may be used in Hydrogen Fuel Cells or Direct Methanol Fuel Cells. The membranes may also be used in filtration (as parts of filtration membranes), for example in ultrafiltration, microfiltration or in reverse osmosis. The most preferred use is in a fuel cell as described.

The following further utilities are also contemplated:
1. Proton exchange membrane based water electrolysis, which involves a reverse chemical reaction to that employed in hydrogen/oxygen electrochemical fuel cells.
2. Chloralkali electrolysis, typically involving the electrolysis of a brine solution to produce chlorine and sodium hydroxide, with hydrogen as a by-product.
3. Electrode separators in conventional batteries due to the chemical inertness and high electrical conductivity of the composite membranes.
4. Ion-selective electrodes, particularly those used for the potentiometric determination of a specific ion such as $Ca^{2+}$, $Na^+$, $K^+$ and like ions. The composite membrane could also be employed as the sensor material for humidity sensors, as the electrical conductivity of an ion exchange membrane varies with humidity.
5. Ion-exchange material for separations by ion-exchange chromatography. Typical such applications are deionization and desalination of water (for example, the purification of heavy metal contaminated water), ion separations (for example, rare-earth metal ions, trans-uranium elements), and the removal of interfering ionic species.
6. Ion-exchange membranes employed in analytical preconcentration techniques (Donnan Dialysis). This technique is typically employed in analytical chemical processes to concentrate dilute ionic species to be analysed.
7. Ion-exchange membranes in electrodialysis, in which membranes are employed to separate components of an ionic solution under the driving force of an electrical current. Electrolysis applications include the industrial-scale desalination of brackish water, preparation of boiler feed make-up and chemical process water, de-ashing of sugar solutions, deacidification of citrus juices, separation of amino acids, and the like.
8. Membranes in dialysis applications, in which solutes diffuse from one side of the membrane (the feed side) to the other side according to their concentration gradient. Separation between solutes is obtained as a result of differences in diffusion rates across the membrane arising from differences in molecular size. Such applications include hemodialysis (artificial kidneys) and the removal of alcohol from beer.
9. Membranes in gas separation (gas permeation) and pervaporation (liquid permeation) techniques.
10. Bipolar membranes employed in water splitting and subsequently in the recovery of acids and bases from waste water solutions.

Polymers having units I, II, III, IV, IV*, V and/or V* may be prepared by:

(a) polycondensing a compound of general formula

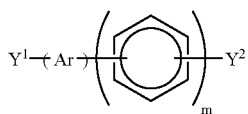
VI with itself wherein $Y^1$ represents a halogen atom or a group —EH and $Y^2$ represents a halogen atom or, if $Y^1$ represents a halogen atom, $Y^2$ represents a group E'H; or (b) polycondensing a compound of general formula

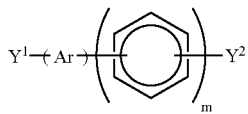
VI with a compound of formula

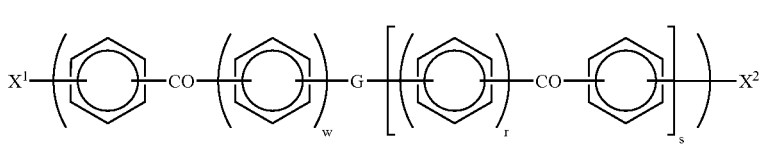
VII and/or with a compound of formula

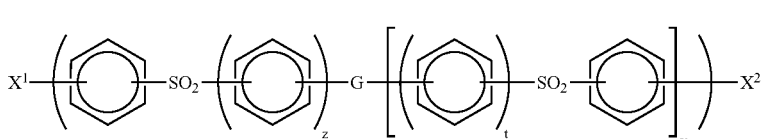
VIII wherein $Y^1$ represents a halogen atom or a group —EH (or —E'H if appropriate) and $X^1$ represents the other one of a halogen atom or group —EH (or —E'H if appropriate) and $Y^2$ represents a halogen atom or a group —E'H and $X^2$ represents the other one of a halogen atom or a group —E'H (or —EH if appropriate).

(c) optionally copolymerizing a product of a process as described in paragraph (a) with a product of a process as described in paragraph (b);

wherein the phenyl moieties of units VI, VII and/or VIII are optionally substituted; the compounds VI, VII and/or VIII are optionally sulphonated; and Ar, m, w, r, s, z, t, v, G, E and E' are as described above except that E and E' do not represent a direct link;

the process also optionally comprising sulphonating and/or cross-linking a product of the reaction described in paragraphs (a), (b) and/or (c) to prepare said polymer.

In some situations, the polymer prepared, more particularly phenyl groups thereof, may be optionally substituted with the groups hereinabove described after polymer formation.

Preferably, where $Y^1$, $Y^2$, $X^1$ and/or $X^2$ represent a halogen, especially a fluorine, atom, an activating group, especially a carbonyl or sulphone group, is arranged ortho- or para- to the halogen atom.

Preferred halogen atoms are fluorine and chlorine atoms, with fluorine atoms being especially preferred. Preferably, halogen atoms are arranged meta- or para- to activating groups, especially carbonyl groups.

Where the process described in paragraph (a) is carried out, preferably one of $Y^1$ and $Y^2$ represents a fluorine atom and the other represents an hydroxy group. More preferably in this case, $Y^1$ represents a fluorine atom and $Y^2$ represents an hydroxy group. Advantageously, the process described in paragraph (a) may be used when Ar represents a moiety of structure (i) and m represents 1.

When a process described in paragraph (b) is carried out, preferably, $Y^1$ and $Y^2$ each represent an hydroxy group. Preferably, $X^1$ and $X^2$ each represent a halogen atom, suitably the same halogen atom.

The polycondensation reaction described is suitably carried out in the presence of a base, especially an alkali metal carbonate or bicarbonate or a mixture of such bases. Preferred bases for use in the reaction include sodium carbonate and potassium carbonate and mixtures of these.

The identity and/or properties of the polymers prepared in a polycondensation reaction described may be varied according to the reaction profile, the identity of the base used, the temperature of the polymerisation, the solvent(s) used and the time of the polymerisation. Also, the molecular weight of a polymer prepared controlled by using an excess of halogen or hydroxy reactants, the excess being, for example, in the range 0.1 to 5.0 mole %

In a polymer prepared in a said polycondensation reaction involving compounds of general formula VI, VII, and VIII, moieties of general formula VI, VII, and VIII (excluding end groups $Y^1$, $Y^2$, $X^1$ and $X^2$) may be present in regular succession (that is, with single units of one said moiety, separated by single units of another said moiety or moieties), or semi-regular succession (that is, with single units of one said moiety separated by strings of another moiety or moieties which are not all of the same length) or in irregular succession (that is, with at least some multiple units of one moiety separated by strings of other moieties that may or may not be of equal lengths). The moieties described are suitably linked through ether or thioether groups.

Also, moieties in compounds VI, VII and VIII arranged between a pair of spaced apart —O— atoms and which include a -phenyl-SO$_2$ or -phenyl-CO— bonded to one of the —O— atoms may, in the polymer formed in the polycondensation reaction, be present in regular succession, semi-regular succession or in irregular succession, as described previously.

In any sampled polymer, the chains that make up the polymer may be equal or may differ in regularity from one another, either as a result of synthesis conditions or of deliberate blending of separately made batches of polymer.

Compounds of general formula VI, VII and VIII are commercially available (eg from Aldrich U.K.) and/or may be prepared by standard techniques, generally involving Friedel-Crafts reactions, followed by appropriate derivatisation of functional groups. The preparations of some of the monomers described herein are described in P M Hergenrother, B J Jensen and S J Havens, Polymer 29, 358 (1988), H R Kricheldorf and U Delius, Macromolecules 22, 517 (1989) and P A Staniland, Bull, Soc, Chem, Belg., 98 (9–10), 667 (1989).

Where compounds VI, VII and/or VIII are sulphonated, compounds of formulas VI, VII and/or VIII which are not sulphonated may be prepared and such compounds may be sulphonated prior to said polycondensation reaction.

Sulphonation as described herein may be carried out in concentrated sulphuric acid (suitably at least 96% w/w, preferably at least 97% w/w, more preferably at least 98% w/w; and preferably less than 98.5% w/w) at an elevated temperature. For example, dried polymer may be contacted with sulphuric acid and heated with stirring at a temperature of greater than 40° C., preferably greater than 55° C., for at least one hour, preferably at least two hours, more preferably about three hours. The desired product may be caused to precipitate, suitably by contact with cooled water, and isolated by standard techniques. Sulphonation may also be effected as described in U.S. Pat. No. 5,362,836 and/or EP0041780.

Any feature of any aspect of any invention or embodiment described herein may be combined with any feature of any aspect of any other invention or embodiment described herein.

BRIEF DESCRIPTION OF THE DRAWINGS

Specific embodiments of the invention will now be described, by way of example, with reference to FIG. 1 which is a schematic representation of a polymer electrolyte membrane fuel cell.

Unless otherwise stated, all chemicals referred to hereinafter were used as received from Sigma-Aldrich Chemical Company, Dorset, U.K.

EXAMPLES

Example 1a

Figure 1:
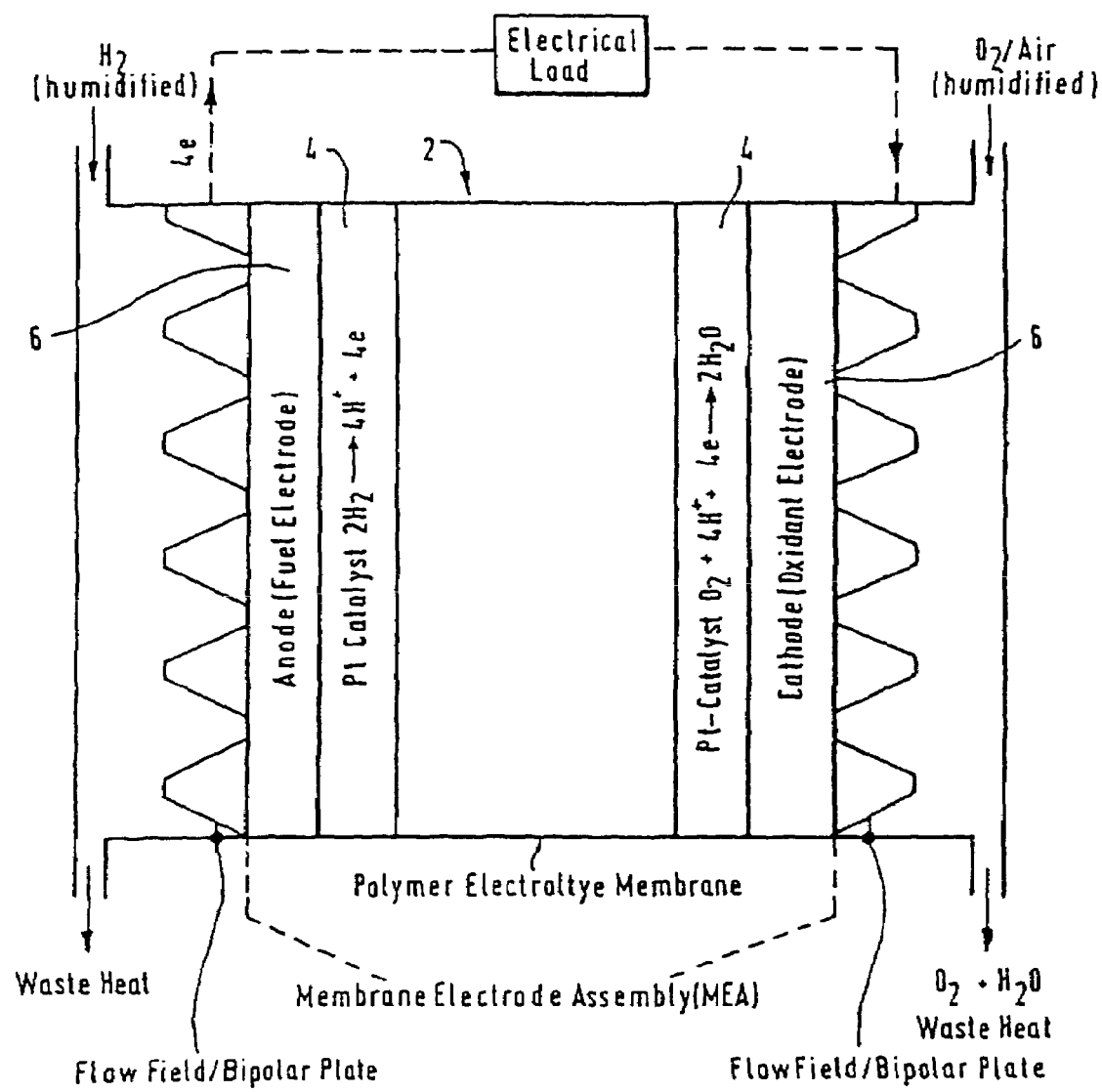

A 700 ml flanged flask fitted with a ground glass Quickfit lid, stirrer/stirrer guide, nitrogen inlet and outlet was charged with 4,4'-difluorobenzophenone (89.03 g, 0.408 mole) (BDF), 4,4'-dihydroxybiphenyl (24.83, 0.133 mole), 4,4'-dihydroxydiphenylsulphone (13.35 g, 0.053 mole) (Bis-S), 4,4'-dihydroxybenzophenone (45.7 g, 0.213 mole) (DHB) and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 320° C. over 3 hours then maintained for 1.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.39 kNsm$^{-2}$.

Examples 1b–1e and 1f (Comparative)

The polymerisation procedure of Example 1a was followed, for 1b–1e, except that copolymers were prepared by varying the mole ratios of the hydroxy-containing reactants. The polymerisation procedure for 1f is described below.

A 700 ml flanged flask-fitted with a ground glass Quickfit lid, stirrer/stirrer guide, nitrogen inlet and outlet was charged with 4,41-difluorobenzophenone (89.03 g, 0.408 mole), 4,4'-dihydroxybiphenyl (24.83 g, 0.133 mole) 4,41-dihydroxydiphenylsulphone (66.73 g, 0.267 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (42.44 g, 0.4 mole) and potassium carbonate (1.11 g, 0.008 mole) were added. The temperature was raised gradually to 315° C. over 3 hours then maintained for 0.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.62 kNsm$^{-2}$ A summary of the mole ratios and MVs are detailed in the Table below. Example 1f is an amorphous equivalent of the other polymers.

| Example | Polymer Composition (mole ratio) | | | | MV (kNsm$^{-2}$) |
| --- | --- | --- | --- | --- | --- |
| | BDF | BP | DHB | Bis-S | |
| 1a | 1.02 | 0.33 | 0.533 | 0.133 | 0.37 |
| 1b | 1.02 | 0.33 | 0.402 | 0.268 | 0.47 |
| 1c | 1.02 | 0.33 | 0.335 | 0.335 | 0.48 |
| 1d | 1.02 | 0.33 | 0.268 | 0.402 | 0.48 |
| 1e | 1.02 | 0.33 | 0.133 | 0.536 | 0.53 |
| 1f | 1.02 | 0.33 | — | 0.67 | 0.62 |

Examples 2a–2e and 2f (Comparative)

The polymers from Examples 1a–1f were sulphonated by stirring the respective polymers in 98% sulphuric acid (3.84 g polymer/100 g sulphuric acid) for 21 hours at 50° C. Thereafter, the reaction solution was allowed to drip into stirred deionised water. Sulphonated polymer precipitated as free-flowing beads. Recovery was by filtration, followed by washing with deionised water until the pH was neutral and subsequent drying. In general, titration confirmed that 100 mole % of the biphenyl units had sulphonated, giving one sulphonic acid group, ortho to the ether linkage, on each of the two aromatic rings comprising the biphenyl unit.

Examples 3a–3e and 3f (Comparative)

Membrane Fabrication

Membranes were produced from the sulphonated polymers of respective Examples 2a–2f by dissolving respective polymers in N-methylpyrrolidone (NMP). The polymers were dissolved at 80° C. at their maximum concentration. In one example, a 50:50 w/w blend of the polymers described in Examples 3d and 3e, sulphonated as described in Example 2, was used to prepare a membrane. The homogeneous solutions were cast onto clean glass plates and then drawn down to give 400 micron films, using a stainless steel Gardner Knife. Evaporation at 100° C. under vacuum for 24 hours produced membranes of mean thickness 40 microns.

Examples 4a–4e and 4f (Comparative)

Water-Uptake of the Membranes 5 cm×5 cm×40 microns sample of the membranes from Example 3a–3f were immersed in boiling deionised water (500 ml) for 60 mins, removed and dried quickly with lint-free paper to remove surface water, weighed, dried in an oven at 50° C. for 1 day, allowed to cool to ambient temperature in a desiccator then weighed quickly. The % water-uptake was calculated as follows and the results are provided in the Table presented in Example 6.

$$\% \text{ Water-uptake} = \frac{\text{Wet Weight} - \text{Dry Weight}}{\text{Dry Weight}} \times 100$$

Example 5

Post Treatment of the Membrane with Dichloromethane

The 5 cm×5 cm×40 microns sample of membrane from Example 4a was immersed in dichloromethane (100 ml) for 60 mins, removed and dried in an oven at 50° C. for 1 day. Immersed in boiling deionised water (500 ml) for 60 mins, removed and dried quickly with lint-free paper to remove surface water, weighed, dried in an oven at 50° C. for 1 day, allowed to cool to ambient temperature in a desiccator then weighed quickly. The % water-uptake was 35%, as calculated previously.

Example 6a

Post Treatment of the Membranes from 4a–4f with Acetone.

The procedure of Example 5 was followed, except that the membranes from Examples 3a–3f were immersed in refluxing acetone. The % water-uptake of each membrane was as calculated previously and summarised in the Table below.

| Sulphonated polymer from Example | Boiling Water uptake before acetone treatment (%) | Boiling Water uptake after acetone treatment (%) | Theoretical EW | Actual EW (by titration) |
|---|---|---|---|---|
| 3a | 69 | 61 | 657 | |
| 3b | 77 | 48 | 663 | 667 |
| 3c | 81 | 57 | 670 | 671 |
| 3d | 90 | 63 | 676 | 685 |
| 3e | 172 | 100 | 683 | 663 |
| 3f | 165 | 170 | 690 | 660 |
| 50:50 w/w blend of polymers from Examples 3d and 3e | 128 | 73 | | |

Example 6b

Determination of the Crystallinity Index Values of Sulphonated Polymers from Examples 1b, 1d and 1f Before and After Acetone Treatment by Wide Angle X-Ray Scattering (WAXS)

Crystallinity can be quantified, in one method, by defining a "crystallinity index" for measurements made by Wide Angle X-ray Scattering (WAXS). This approach defines the measurement in relation to the WAXS pattern. The measured area of crystalline peaks in the WAXS pattern is taken as a percentage of the total crystalline and amorphous scatter over a chosen angular range of the pattern. Crystallinity index should, to a first approximation, be proportional to crystallinity for broadly similar polymer materials. It is constrained to be zero when crystallinity is zero and 100% when crystallinity is 100%.

Membranes of the sulphonated polymers from Examples 1b, 1d and 1f as prepared in Example 3b, 3d and 3f and post treated with acetone as described in Example 6 were examined by WAXS as described below.

The membranes were analysed using a Siemens D5000 X-ray diffractometer with Cu K-alpha radiation and a Kevex energy dispersive detector. Measurements were made from a single membrane sheet mounted in symmetrical reflection geometry. A programmable divergence slit was used to maintain a constant irradiated region of the specimen surface 6 mm long over a 2-theta measurement range of 10–49°.

The WAXS pattern of the membrane from Example 1f before and after acetone treatment exhibited only broad amorphous scatter, whereas the patterns of the membranes from Examples 1b and 1d, before and after acetone treatment exhibited sharper, crystalline peaks in addition to amorphous bands.

The measured WAXS patterns were analysed by first making a background correction, subtracting the corresponding WAXS pattern from a blank specimen holder. The resulting patterns were fitted by a combination of a pattern measured from a similar but amorphous membrane film and a set of peaks (at approximately 18.8, 20.8, 22.9, 29.1 and 40.0° 2-theta) corresponding to those observed in the more crystalline membranes. The crystallinity index was calculated as the total area fitted by these peaks taken as a percentage of the combined area of the fitted peaks and the fitted amorphous pattern.

The results are detailed in the Table below.

| Sulphonated polymer from Example | Crystallinity Index (%) | |
|---|---|---|
| | Before acetone treatment | After acetone treatment |
| 1f | 0 | 0 |
| 1d | 2 | 5.5 |
| 1b | 7 | 9 |

Example 7a

A 700 ml flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (29.79 g, 0.16 mole), 4,4'-dihydroxydiphenylsulphone (36.04 g, 0.144 mole), 4,4'-dihydroxybenzophenone (20.57 g, 0.096 mole) and diphenylsulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 320° C. over 3 hours then maintained for 1.5 hours.

The reaction mixture was allowed to cool, milled and washed with acetone and water. The resulting polymer was dried in an air oven at 120° C. The polymer had a melt viscosity at 400° C., 1000 sec$^{-1}$ of 0.6 kNsm$^{-2}$.

Examples 7b–7e and 7f (Comparative)

The polymerisation procedure of Example 7a was followed, except that copolymers were prepared by varying the mole ratios of the hydroxy-containing reactants. A summary of the mole ratios and the MVs are detailed in the Table below.

| Example | Polymer Composition (mole ratio) | | | | MV (KNsm$^{-2}$) | Theoretical EW | Actual EW (by titration) |
|---|---|---|---|---|---|---|---|
| | BDF | BP | DHB | Bis-S | | | |
| 7a | 1.02 | 0.4 | 0.24 | 0.36 | 0.6 | 564 | 564 |
| 7b | 1.02 | 0.4 | 0.36 | 0.24 | 0.21 | 559 | 564 |
| 7c | 1.02 | 0.4 | 0.39 | 0.21 | 0.32 | 558 | 571 |
| 7d | 1.02 | 0.4 | 0.42 | 0.18 | 0.44 | 557 | 591 |
| 7e | 1.02 | 0.4 | 0.6 | — | 0.45 | 550 | 572 |
| 7f | 1.02 | 0.4 | — | 0.6 | 0.26 | 583 | 602 |

Examples 8a–8e and 8f (Comparative)

Sulphonation and Subsequent Dissolution of Polymers from Examples 7a–f

The polymers from Examples 7a–f were sulphonated as described in Example 2, dissolved in NMP, filtered through a 10 micron filter, cast on to clean glass plates and drawn down, using a Gardner Knife. The solvent was evaporated at 100° C. under vacuum for 24 hours producing membranes of mean thickness of 40 microns. The boiling water uptake was determined as described in Example 4. The results are detailed in the Table presented in Example 9.

Example 9a

Post Treatment of the Membranes from 8a–8f with Acetone.

The procedure of Example 5 was followed, except that the membranes from Examples 8a–8f were immersed in refluxing acetone. The % water-uptake of each membrane was calculated as described in Example 4. The results are summarised in the Table below.

| Sulphonated polymer from Example | Boiling Water uptake before acetone treatment (%) | Boiling Water uptake before acetone Treatment (%) |
|---|---|---|
| 8a | 550 | 130 |
| 8b | 190 | 97 |
| 8c | 135 | 81 |
| 8d | 109 | 58 |
| 8e | 82 | 69 |
| 8f | 520 | 520 |

Example 9b

Determination of the Crystallinity Index Values of Sulphonated Polymers from Examples 9c and 9f by WAXS Membranes of the sulphonated polymers from Examples 7c and 7f as prepared in Examples 8c and 8f and post treated with acetone in Example 9 were examined by WAXS as described in the previous Example.

The WAXS pattern of the membrane from Example 7f before and after acetone treatment exhibited only broad amorphous scatter, whereas the patterns of the membrane from Examples 7c before and after acetone treatment exhibited sharper, crystalline peaks in addition to amorphous bands.

The results are detailed in the Table below.

| Sulphonated polymer from Example | Crystallinity Index (%) | |
|---|---|---|
| | Before acetone treatment | After acetone treatment |
| 7f | 0 | 0 |
| 7c | 6 | 12 |

Examples 10a–10d

Sulphonation of Polyetherketone and Subsequent Dissolution

A 500 ml, 3-necked, round-bottomed flask fitted with a stirrer/stirrer guide, nitrogen inlet and outlet and a thermometer was charged with 98% sulphuric acid (180 g) and, while stirring, polyetherketone (PEK™ P22, Victrex plc) (20 g) was added. The temperature was increased to 55° C. and oleum (20% free $SO_3$) (120 g) was added. The solution was stirred for 60 minutes at 55° C. The solution was quickly cooled to 20° C., thereafter, allowed to drip into stirred deionised water. Sulphonated polymer precipitated as free-flowing beads. Recovery was by filtration, followed by washing with deionised water until the pH was neutral and subsequent drying. By titration the Equivalent Weight was 476.

The above procedure was repeated three times except that the sulphonating solution was heated to 35° C. before oleum was added and maintained at that temperature for 60 mins before being rapidly cooled to 20° C. The Equivalent Weights of the sulphonated polymers was 568, 667 and 758.

The sulphonated polyetherketone polymers described above were separately dissolved in NMP, filtered through a 10 micron filter, cast on to clean glass plates and drawn down, using a Gardner Knife. The solvent was evaporated at 100° C. under vacuum for 24 hours producing membranes of mean thickness of 40 microns. The boiling water uptake was determined as described in Example 4. The results are detailed in the Table presented in Example 11.

Example 11

Post Treatment of the Membranes from 10a–10d with Acetone.

The procedure of Example 5 was followed, except that the membranes from Examples 10a–10c were immersed in refluxing acetone. The % water-uptake of each membrane was calculated as described in Example 4 and summarised in the Table below.

| Sulphonated polymer from Example | EW | Boiling Water uptake before acetone treatment (%) | Boiling Water uptake after acetone Treatment (%) |
|---|---|---|---|
| 10a | 476 | Sample broke up | 124 |
| 10b | 568 | 950 | 72 |
| 10c | 670 | 370 | 56 |
| 10d | 758 | 80 | 51 |

Example 12a

A 700 ml flanged flask fitted with a ground glass Quickfit lid, stirrer/stirrer guide, nitrogen inlet and outlet was charged with 4,4'-difluorobenzophenone (89.03 g, 0.408 mole) 4,4'-dihydroxybiphenyl (24.83 g, 0.133 mole), 2,4-dihydroxybenzophenone (11.42 g, 0.053 mole), 4,4'-dihydroxybenzophenone (45.7 g, 0.213 mole) and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 320° C. over 3 hours then maintained for 1.5 hours.

The reaction mixture was allowed to cool, milled and washed with acetone and water. The resulting polymer was dried in an air oven at 120° C. The polymer had a melt viscosity at 400° C., 1000 $sec^{-1}$ of 0.80 $kNsm^{-2}$.

Examples 12b and 12c

The polymerisation procedure of Example 12a was followed except that copolymers were prepared with a different mole ratio of hydroxy-containing reactants. A summary of the mole ratios and MVs for Examples 12a, 12b and 12c are detailed in the table below.

| | Polymer Composition (mole ratio) | | | | MV |
|---|---|---|---|---|---|
| Example | BDF | BP | 4,4'-DHB | 2,4-DHB | $(kNsm^{-2})$ |
| 12a | 1.02 | 0.33 | 0.533 | 0.133 | 0.70 |
| 12b | 1.02 | 0.33 | 0.402 | 0.268 | 0.38 |
| 12c | 1.02 | 0.33 | 0.133 | 0.533 | 0.47 |

Example 13

The polymers of Example 12a, 12b and 12c were sulphonated, fabricated into membranes, assessed and post-treated with acetone as described in respective examples 2, 3, 4 and 6 and the results are provided in the table below.

| Sulphonated polymer from Example | Theoretical EW | Measured EW (by titration) | Concentration in NMP (% w/w) | Boiling Water Uptake before acetone treatment (%) | Boiling Water Uptake after acetone treatment (%) |
|---|---|---|---|---|---|
| 12a | 647 | 666 | 5 | 73 | 58 |
| 12b | 655 | 671 | 10 | 100 | 69 |
| 12c | 670 | 681 | 15 | 518 | 208 |

Example 14

A 250 ml 3-necked, round-bottomed fitted with a stirrer/stirrer guide, nitrogen inlet and outlet was charged with 4,41-difluorobenzophenone (11.36 g, 0.052 mole), 4,4'-bis(4-chlorophenylsulphonyl)biphenyl (LCDC) (25.17 g, 0.05 mole), 4,4'-dihydroxybiphenyl (6.21 g, 0.0333 mole), 4,4'-dihydroxybenzophenone (14.28 g, 0.0667 mole), and diphenysulphone (90 g) and purged with nitrogen for over 1 hour. The contents were then heated under a nitrogen blanket to between 140 and 150° C. to form an almost colourless solution. While maintaining a nitrogen blanket, dried sodium carbonate (10.6 g, 0.1 mole) and potassium carbonate (0.28 g, 0.002 mole) were added. The temperature was raised gradually to 315° C. over 3 hours then maintained for 1 hour.

The reaction mixture was allowed to cool, milled and washed with acetone and water. The resulting polymer was dried in an air oven at 120° C. The polymer had a melt viscosity at 400° C., 1000sec$^{-1}$ of 0.18kNsm$^{-2}$.

Example 15

A 250 ml 3-necked, round-bottomed fitted with a stirrer/stirrer guide, nitrogen inlet and outlet was charged with 4,4'-difluorobenzophenone (11.02 g, 0.0505 mole), 4,41-dichlorodiphenylsulphone (14.36 g, 0.05 mole), 4,4'-dihydroxybiphenyl (6.21 g, 0.0333 mole), 4,4'-dihydroxybenzophenone (14.28 g, 0.0667 mole), and diphenysulphone (83 g) and purged with nitrogen for over 1 hour. The contents were then heated under a nitrogen blanket to between 140 and 150° C. to form an almost colourless solution. While maintaining a nitrogen blanket, dried sodium carbonate (10.60 g, 0.1 mole) and potassium carbonate (0.28 g, 0.002 mole) were added. The temperature was raised gradually to 315° C. over 3 hours then maintained for 140 minutes.

The reaction mixture was allowed to cool, milled and washed with acetone and water. The resulting polymer was dried in an air oven at 120° C. The polymer had a melt viscosity at 400° C., 1000 sec$^{-1}$ of 0.39 kNsm$^{-2}$.

Example 16

Sulphonation of and Subsequent Dissolution and Membrane Fabrication of Polymers from Examples 14 and 15

The polymers from Examples 14 and 15 were sulphonated as described in Example 2 and separately dissolved in NMP at 15% w/w at 80° C. and room temperature respectively. The homogeneous solutions were filtered through a 10 micron filter, cast on to clean glass plates and drawn down to give 400 micron films, using a Gardner Knife. The solvent was evaporated at 100° C. under vacuum for 24 hours. The boiling water uptake was determined for each membrane as described in Example 4. The results are detailed in the Table below.

| Sulphonated polymer from Example | Theoretical EW | Measured EW (by titration) | Concentration in NMP (% w/w) | Boiling Water Uptake before acetone treatment (%) | Boiling Water Uptake after acetone treatment (%) |
|---|---|---|---|---|---|
| 14 | 830 | 858 | 15 | 39 | 31 |
| 15 | 680 | 691 | 15 | 108 | 46 |

Example 17

Post Treatment of the Membranes from Examples 3e and 8a with THF.

The procedure of Example 5 was followed, except that the membranes from Examples 3e and 8a were immersed in refluxing THF. The % water-uptake of each membrane was calculated as described in Example 4. The results are summarised in the Table below.

| Sulphonated polymer from Example | Boiling Water uptake before THF treatment (%) | Boiling Water uptake after THF treatment (%) |
|---|---|---|
| 3e | 172 | 115 |
| 8a | 550 | 143 |

Example 18a

A 700 flanged flask fitted with a ground glass Quickfit lid, stirrer/stirrer guide, nitrogen inlet and outlet was charged with 4,4'-difluorobenzophenone (89.03 g, 0.408 mole), 4,4'-dihydroxybiphenyl (37.24 g, 0.20 mole) 4,4'-dihydroxybenzophenone (42.84 g, 0.20 mole), and diphenysulphone (332 g) and purged with nitrogen for over 1 hour. The contents were then heated under a nitrogen blanket to between 140 and 150° C. to form an almost colourless solution. While maintaining a nitrogen blanket, dried sodium carbonate (43.24 g, 0.408 mole) was added. The temperature was raised gradually to 330° C. over 3 hours then maintained for 1 hours.

The reaction mixture was allowed to cool, milled and washed with acetone and water. The resulting polymer was dried in an air oven at 120° C. The polymer had a melt viscosity at 400° C., 1000 sec$^{-1}$ of 0.48 kNsm$^{-2}$.

Example 18b, 18c and 18d (Comparative)

Example 18a has a ratio of DHB:Bis-S of 100:0. Examples 18b –18d are prepared as described for Example 18a except the ratios of DHB:Bis-S are 80:20, 70:30 and 0:100 respectively. The melt viscosities of the polymers were 0.34 kNsm$^{-2}$, 0.42 kNsm$^{-2}$ and 0.43 kNsm$^{-2}$ respectively.

Example 19

The polymers of Examples 18a–18d were sulphonated, fabricated into membranes, assessed and post-treated with acetone as described in respective examples 2, 3, 4 and 6 and the results are provided in the table below.

| Example No | Sulphonated polymer from (% w/w) DHB:Bis-S | EW Theorerical | EW Actual (by titration) | Boiling Water Uptake before acetone treatment (%) | Boiling Water Uptake after acetone treatment (%) |
| --- | --- | --- | --- | --- | --- |
| 18a | 100:0 | 458 | 472 | 237 | 116 |
| 18b | 80:20 | 462 | 483 | 300 | 125 |
| 18c | 70:30 | 464 | 480 | 320 | 152 |
| 18d | 0:100 | 476 | 492 | Soluble | Soluble |

Example 20

Sulphonation of Polyetheretherketone and Subsequent Dissolution

A 500 ml, 3-necked, round-bottomed flask fitted with a stirrer/stirrer guide, nitrogen inlet and outlet and a thermometer was charged with 98% sulphuric acid (180 g ). The sulphuric acid was heated under a blanket of nitrogen to 50° C. While maintaining a nitrogen blanket and stirring polyetheretherketone (PEEK™ 450P, Victrex plc) was added. The polymer dissolved and was stirred at 50° C. for 90 minutes. The solution was quickly cooled to 20° C., thereafter allowed to drip into stirred deionised water. Sulphonated polymer precipitated as free-flowing beads. Recovery was by filtration, followed by washing with deionised water until the pH was neutral and subsequent drying. By titration the Equivalent Weight was 644.

The sulphonated polymer described above was dissolved in NMP (15% w/w), filtered through 10 micron filter, cast on to a clean glass plate and drawn down, using a Gardner Knife. The solvent was evaporated at 100° C. under vacuum for 24 hours producing a membrane of mean thickness of 40 microns. In boiling water the membrane was swollen excessively and broke into pieces.

Example 21

Post Treatment of the Membrane from Example 20

The procedure of Example 5 was followed, except that the membrane from Example 19 was immersed in refluxing acetone. In boiling water the membrane remained intact and the % water uptake was 127% as calculated as described in Example 4.

Example 22

Blends with Polyethersulphone

The polymer from Example 1d, sulphonated as described and polyethersulphone were dissolved in N-methylpyrrolidone (NMP) at concentrations shown in the Table below. The homogeneous solutions were cast onto clean glass plates and then drawn down to give 400 micron films, using a stainless steel Gardner Knife. Evaporation at 100° C. under vacuum for 24 hours produced membranes of mean thickness 40 microns.

The boiling water uptake of each membrane was determined as described in Example 4. The results are detailed in the Table below.

The procedure of Example 5 was followed, except that the membranes were immersed in refluxing acetone. The boiling water uptake of each membrane was determined as described in Example 4. The results are detailed in the Table below.

| Sulphonated Polymer from Example 5d % w/w | Polyether-sulphone % w/w | Boiling Water Uptake before acetone treatment (%) | Boiling Water Uptake after acetone treatment (%) |
| --- | --- | --- | --- |
| 15 | 0 | 102 | 61 |
| 14.25 | 0.75 | 125 | 74 |
| 13.5 | 1.5 | 105 | 67 |

Example 23

The procedure of Example 22 was followed except the sulphonated polymer from Example 1d was replaced with the polymer of Example 8d. The boiling water uptake was determined as described in Example 4 and the procedure of Example 5 was followed, except that the membranes were immersed in refluxing acetone. Results are provided in the table below.

| Sulphonated Polymer from 8d (% w/w) | Polyether-sulphone (% w/w) | Boiling Water Uptake before acetone treatment (%) | Boiling Water Uptake after acetone treatment (%) |
| --- | --- | --- | --- |
| 15 | 0 | 109 | 58 |
| 14.25 | 0.75 | 84 | 59 |
| 13.5 | 1.5 | 74 | 54 |
| 12.75 | 2.25 | 69 | 48 |
| 12.0 | 3.0 | 49 | 39 |

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method of preparing an ion-conducting material, the method comprising:

(i) selecting a first ion-conducting polymeric material which has at least some crystallinity or which is crystallisable, wherein said first ion-conducting polymeric material includes a repeat unit which includes aromatic group containing moieties linked by —CO— and/or —Q— groups, wherein Q represents —O— or —S— provided that said repeat unit includes at least some ketone moieties;

(ii) treating said first ion-conducting polymeric material with a means to increase its crystallinity, thereby to produce a treated ion-conducting polymeric material which is the same first ion-conducting polymeric material as that selected in step (i), except that said material has increased crystallinity.

2. A method according to claim 1, wherein the level of crystallinity in said treated ion-conducting material is at least 1% greater than the level of crystallinity in said first ion-conducting polymeric material selected from step (i).

3. A method according to claim 2, wherein the level of crystallinity is at least 5% greater.

4. A method according to claim 1, wherein said means to increase the crystallinity of said first ion-containing polymeric material comprises heating said first ion-conducting polymeric material when in a substantially dry state.

5. A method according to claim 1, wherein said means to increase the crystallinity of said first ion-conducting polymeric material comprises treatment of said first ion-conducting polymeric material with a crystallinity increasing solvent.

6. A method according to claim 5, wherein said solvent is a polar aprotic solvent.

7. A method according to claim 1, wherein the difference between the sensitivity of the material to water before and after treatment is at least 5%.

8. A method according to claim 1, wherein said first ion-conducting polymeric material has a moiety of formula

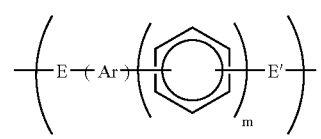

I and/or a moiety of formula

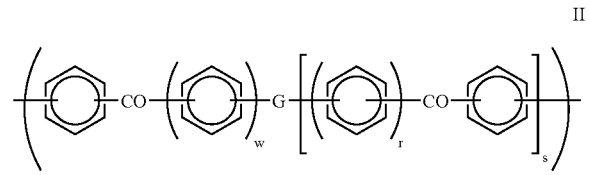

II and/or a moiety of formula

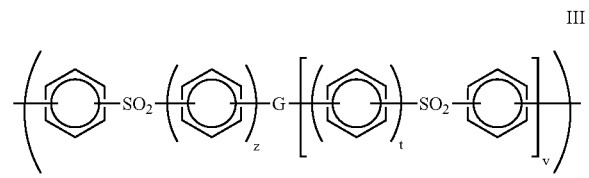

III wherein at least some of the units I, II and/or III are functionalized to provide ion-exchange sites; wherein the phenyl moieties in units I, II, and III are independently optionally substituted and optionally cross-linked; wherein said material is crystallisable or crystalline; and wherein m, r, s, t, v, w and z independently represent zero or a positive integer, E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i)* or (i) to (x) which is bonded via one or more of its phenyl moieties to adjacent moieties

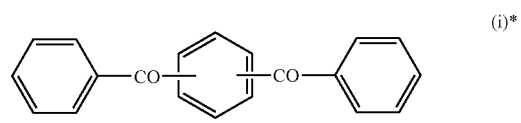

(i)*

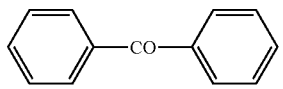 (i)
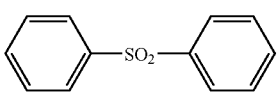 (ii)
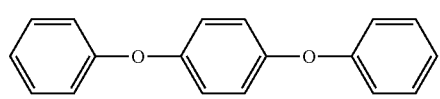 (iii)
 (iv)
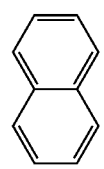 (v)
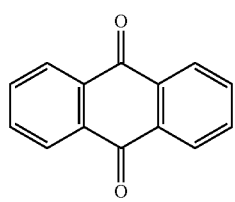 (vi)
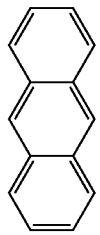 (vii)
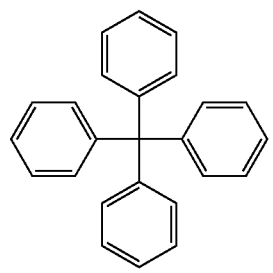 (viii)
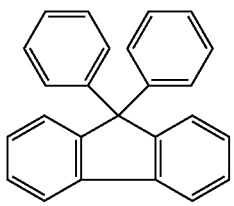 (ix)
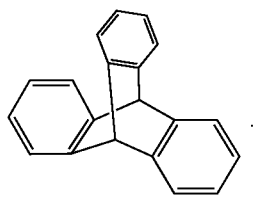 (x)
9. A method according to claim 1, wherein said first ion-conducting polymeric material is sulphonated.
10. A method according to claim 1, wherein said first ion-conducting polymeric material is a homopolymer having a repeat unit of general formula

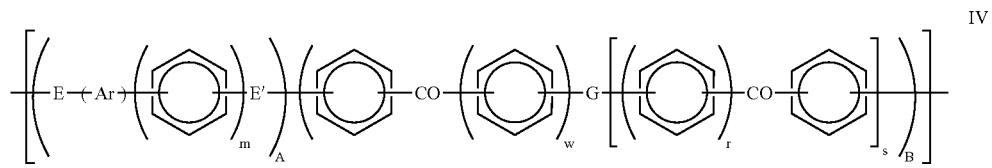

or a homopolymer having a repeat unit of general formula

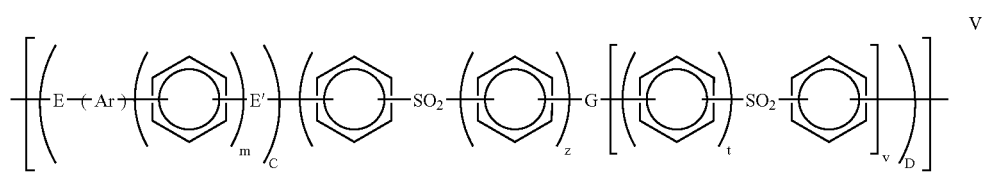

or a homopolymer having a repeat unit of general formula

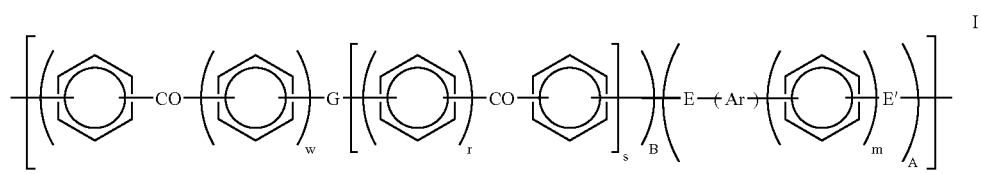

or a homopolymer having a repeat unit of general formula

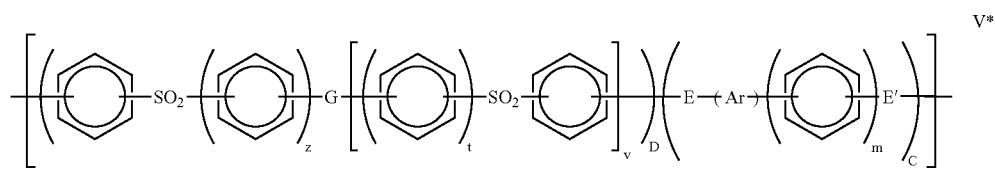

or a random or block copolymer of at least two different units of IV and V or of IV* and V*, wherein A, B, C, and D independently represent 0 or 1, wherein m, r, s, t, v, w and z independently represent zero or a positive integer and E and E' independently represent an oxygen or a sulphur atom or a direct link, G represents an oxygen or sulphur atom, a direct link or a —O—Ph—O— moiety where Ph represents a phenyl group and Ar is selected from one of the following moieties (i)* or (i) to (x) which is bonded via one or more of its phenyl moieties to adjacent moieties

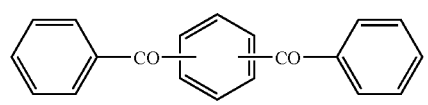 (i)*

-continued

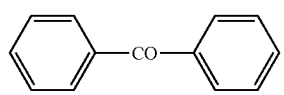 (i)

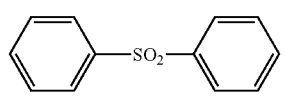 (ii)

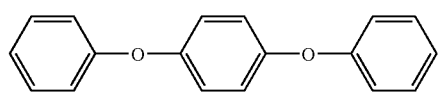 (iii)

 (iv)

(v) [naphthalene structure]

(vi) [anthraquinone structure]

(vii) [anthracene structure]

(viii) [tetraphenylmethane structure]

(ix) [9,9-diphenylfluorene structure]

(x) [triptycene-like structure]

11. A method according to claim 1, wherein said first ion-conducting polymeric material includes a multi-phenylene moiety and or a fused ring aromatic moiety which is functionalised to provide ion-exchange sites.

12. A method according to claim 1, wherein said first ion-conducting polymeric material includes a —O-biphenylene-O— or —O-naphthalene-O— moiety.

13. A method according to claim 1, wherein said first ion-conducting polymeric material is a copolymer comprising a first repeat unit which is selected from the following:

(a) a unit of formula IV wherein E and E' represent oxygen atoms, G represents a direct link, Ar represents a moiety of structure (iv), m and s represent zero, w represents 1 and A and B represent 1;

(b) a unit of formula IV wherein E represents an oxygen atom, E' represents a direct link, Ar represents a moiety of structure (i), m represents zero, A represents 1, B represents zero;

(c) a unit of formula V wherein E and E' represent oxygen atoms, G represents a direct link, Ar represents a moiety of structure (iv), m and v represent zero, z represents 1 and C and D represent 1;

(d) a unit of formula V wherein E represents an oxygen atom, E' represents a direct link, Ar represents a moiety of structure (ii), m represents 0, C represents 1, D represents 0; or (e) a unit of formula V wherein E and E' represents an oxygen atom, Ar represents a structure (i), m represents 0, C represents 1, Z represents 1, G represents a direct link, v represents 0 and D represents 1;

(aa) a unit of formula IV wherein E represents an oxygen atom E' represents a direct link, Ar represents a structure (i)*, m represents 0, A represents 1, B represents 0;

(bb) a unit of formula IV wherein E and E' represent oxygen atoms, Ar represents a structure (iv), m and w represent 0, G represents a direct link, s and r represent 1, A and B represent 1;

(cc) a unit of formula IV wherein E and E' represent oxygen atoms, Ar represents a structure (i), m and w represent 0, G represents a direct link, s and r represent 1, A and B represent 1;

and a second repeat unit which is selected from the following:

(f) a unit of formula IV wherein F and E' represent oxygen atoms, G represents a direct link, Ar represents a moiety of structure (iv), m represents 1, w represents 1, s represents zero, A and B represent 1;

(g) a unit of formula IV wherein E represents an oxygen atom, E' is a direct link, G represents a direct link, Ar (e) represents a moiety of structure (iv), m and s represent zero, w represent 1, A and B represent 1;

(h) a unit of formula V wherein E and E' represent oxygen atoms, G represents a direct link, Ar represents a moiety of structure (iv), m represents 1, z represents 1, v represents 0, C and D represent 1; and (i) a unit of formula V wherein E represents an oxygen atom, E' represents a direct link, G represents a direct link, Ar represents a moiety of structure (iv), m and v represent zero, z represents 1, C and D represent 1;

(j) a unit of formula IV wherein E and E' represent oxygen atoms, G represents a direct link, Ar represents a moiety of structure (v), m represents 0, w represents 1, s represents 0, A and B represent 1;

(k) a unit of formula V wherein E and E' represent oxygen atoms, G represents a direct link, Ar represents a moiety of structure (v), m represents 0, z represents 1, v represents 0, C and D represent 1.

14. A method according to claim 1, the method including preparing a precursor membrane which includes said first ion-conducting polymeric material and, subsequently, treating said precursor membrane with said means to increase its crystallinity.

15. A method according to claim 1 which includes a step of associating a catalyst material with said ion-conducting material.

16. An ion-conducting material prepared in a method according to claim 1.

17. A method of preparing a Membrane Electrode Assembly (MEA) which includes associating catalyst material and/or an electrode with an ion-conducting membrane prepared in a method according to claim 1.

* * * * *